(12) United States Patent
Norton et al.

(10) Patent No.: US 8,359,295 B2
(45) Date of Patent: *Jan. 22, 2013

(54) USER INTERFACE FOR NAVIGATING A KEYWORD SPACE

(75) Inventors: Kenneth Norton, San Carlos, CA (US); Chung-Man Tam, San Francisco, CA (US); Jianchang Mao, San Jose, CA (US); Zhichen Xu, San Jose, CA (US); Adrienne Bassett, San Francisco, CA (US); Ashley Hall, Menlo Park, CA (US); Nathan Arnold, Toronto (CA)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/282,559

(22) Filed: Oct. 27, 2011

(65) Prior Publication Data

US 2012/0041961 A1   Feb. 16, 2012

Related U.S. Application Data

(63) Continuation of application No. 12/861,382, filed on Aug. 23, 2010, now Pat. No. 8,055,634, which is a continuation of application No. 11/444,141, filed on May 30, 2006, now Pat. No. 7,797,287.

(60) Provisional application No. 60/685,111, filed on May 27, 2005.

(51) Int. Cl.
*G06F 17/00* (2006.01)
*G06F 3/00* (2006.01)
*H04N 7/173* (2006.01)

(52) U.S. Cl. .................. 707/692; 725/92; 715/749
(58) Field of Classification Search .................. None
See application file for complete search history.

(56) References Cited

U.S. PATENT DOCUMENTS

| 7,596,574 | B2 * | 9/2009 | Sweeney | 1/1 |
| 8,010,575 | B2 * | 8/2011 | Heer et al. | 707/803 |
| 2006/0288311 | A1 * | 12/2006 | Heer et al. | 715/853 |
| 2010/0077352 | A1 * | 3/2010 | Heer et al. | 715/821 |
| 2011/0289574 | A1 * | 11/2011 | Hull et al. | 726/7 |

* cited by examiner

*Primary Examiner* — Tarek Chbouki
(74) *Attorney, Agent, or Firm* — Ostrow Kaufman LLP; Seth H. Ostrow

(57) ABSTRACT

The present invention relates to systems, methods, and user interfaces for browsing a collection of content items saved by a user or by one or more buddies associated with a given user. The method of the present invention comprises saving one or more content items and one or more associated keywords as specified by a user. An interface is generated that displays the one or more saved content items and the one or more associated keywords, as well as the one or more buddies associated with a given user. A user indication of the selection of a given keyword or the selection of a given buddy by the user is received. The one or more displayed content items are filtered according to the selected keyword, buddy, or combination of selected keyword and buddy.

20 Claims, 10 Drawing Sheets

USER INTERFACE FOR NAVIGATING A KEYWORD SPACE

CLAIM OF PRIORITY

This application is a Continuation of and claims priority to U.S. application Ser. No. 12/861,382, filed Aug. 23, 2010, which is a Continuation of and claims priority to U.S. application Ser. No. 11/444,141, filed May 30, 2006, now U.S. Pat. No. 7,797,287, Issued on Oct. 14, 2010, entitled "USER INTERFACE FOR NAVIGATING A KEYWORD SPACE", and claims priority to U.S. provisional application No. 60/685,111, entitled "USER INTERFACE FOR NAVIGATING A KEYWORD SPACE," filed May 27, 2005, the disclosure of which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to systems, methods, and user interfaces for exploring content items. More specifically, the present invention relates to the exploration and navigation of content items associated with one or more user-generated keywords.

BACKGROUND OF THE INVENTION

Users of computer systems interact with and collect content items in a wide variety of contexts. For example, users of the World Wide Web can view and save pages or documents of interest as bookmarks or in a personal library of content (e.g., using the "My Web" feature provided to registered users by Yahoo! Inc., assignee of the present application). Users may also collect digital photographs, MP3 files, digital video, or other media content items that might be created by the user or copied from a variety of other sources. Similarly, users may belong to one or more social networks or may interact with applications, such as instant messaging applications, with which one or more friends or "buddies" of a given user may be designated.

As users amass large collections of content, it becomes increasingly difficult for them to find a particular item in the collection. Therefore, most computer systems and programs that allow users to save content items also provide mechanisms for the user to organize such content items. Frequently, this mechanism is a folder or directory structure that allows users to classify content. Typically, hierarchical organization is supported. Thus, for instance, a user can have a "Travel" folder and separate subfolders for different destinations, e.g., "Travel/US," "Travel/Europe," etc. Further subfolders can be created within the folders, for example, "Travel/Europe/Spain," "Travel/Europe/Germany," etc. By placing content items into folders, a user can group related items together.

A user can find items in folders by browsing the folder hierarchy. Numerous user interfaces exist for folder-based browsing. Typically, the interface displays the content of a current folder, including subfolders and content items therein. The user can then navigate to a subfolder or open a content item. The interface usually also provides "Up" and/or "Back" controls, allowing a user to backtrack up the folder hierarchy.

Folders, however, are not an ideal organization for all forms of content as a single content item may fit into multiple categories. For example, if a user has a photograph of herself with a movie star in front of the Eiffel Tower that was taken on a trip to Paris, the user may want to be able to file the photo under the movie star's name and also under "Paris" or "Vacation" or some similar heading. To file the photograph in more than one location, the user would need to make one or more copies of the photograph or use a storage system that allows a content item to be linked to multiple folders.

Instead of utilizing folders, a more flexible organization can be provided by allowing the user to "tag" content items with one or more "keywords" (also referred to in the art as "tags"). A user may perform searches for content items using the one or more keywords associated with the content items. For example, the abovementioned photograph may be associated with the keywords "Paris," "Eiffel Tower," "Vacation," etc. However, while the organization of content items using keywords may allow a user to perform searches for a particular item of content, existing interfaces for performing such searches require a user to remember which keywords were assigned to each respective content item in order to perform a search that results in the retrieval of one or more content items. Additionally, current techniques for storing content items with associated keywords utilize a partially redundant folder structure to enable navigation and browsing.

Therefore, in order to overcome shortcomings with existing techniques for storing and searching among content items, as well as displaying content items to one or more users, embodiments of the present invention provide systems and methods for generating an interface that facilitates browsing saved content items that are associated with one or more user generated keywords.

SUMMARY OF THE INVENTION

The present invention is directed towards systems, methods, and user interfaces for browsing a collection of content items saved by a user. The method of the present invention comprises saving one or more content items and one or more associated keyword as specified by a user. According to one embodiment of the invention, saving a content item comprises saving a copy of a given content item. According to another embodiment of the invention, saving a content item comprises saving a reference to a given content item. The one or more content items saved may comprise web pages, images, video files, audio files or information associated with a buddy of a user.

An interface is generated that displays the one or more saved content items and the one or more associated keywords. The interface generated may display the one or more saved content items and the one or more keywords associated with the saved content items in a list. The one or more keywords associated with the one or more saved content items may be displayed as links that may be selected.

An indication of the selection of a given keyword by the user is received and the one or more displayed content items are filtered according to the selected keyword. According to one embodiment, filtering the one or more displayed content items comprises removing the one or more content items not associated with the keyword selected from the one or more displayed content items. According to another embodiment, filtering the one or more displayed content items comprises displaying the one or more content items associated with the keyword selected at the top of a list comprised of the one or more displayed content items.

The interface generated may display one or more buddies associated with the user. The one or more buddies displayed may be filtered according to the selected keyword. According to one embodiment of the invention, filtering the one or more buddies comprises displaying the one or more buddies that saved one or more content items associated with the keyword selected by the user.

According to a further embodiment, the interface generated displays the one or more content items saved by one or more buddies associated with the user. The one or more content items displayed may comprise the one or more content items saved by the one or more buddies of the user that saved one or more content items associated with the keyword selected by the user.

The present invention is also directed towards a user interface for browsing one or more content items, wherein a content item is associated with one or more keywords. The user interface of the present invention comprises a navigation control element operative to enable a user to select one or more keywords from a list of keywords, wherein each keyword in the list is associated with at least one content item. The navigation control element is further operative to enable a user to select one or more buddies associated with the user and to display one or more buddies associated with the user that saved one or more content items associated with the keyword selected by the user. Additionally, the navigation control element includes an undo control enabling the user to deselect one or more of the selected keywords.

The user interface of the present invention further comprises a content display element operative to display a list of the content items that are associated with the one or more keywords selected by the user. The content display element is operative to display the one or more content items associated with the keyword selected by the user at the top of the list of content items displayed to the user, or to distinguish the one or more content items associated with keyword selected by the user from the one or more content items not associated with the selected keyword. According to one embodiment, the content display element further displays the one or more content items associated with a buddy selected by the user.

The present invention is also directed towards a system for generating a user interface for browsing one or more content items saved by a given user. The system of the present invention comprises a profile component operative to store one or more content items and one or more associated keywords as specified by the user. According to one embodiment of the invention, the profile component is operative to store one or more content items with one or more associated keywords in an index. The profile component may store a copy of a given content item in a content data store. Alternatively, or in conjunction with the foregoing, the profile component may store a reference to a given content item in a content data store.

The system further comprises a user interface component operative to generate a user interface displaying the one or more saved content items and the one or more associated keywords. According to one embodiment, the one or more saved content items and the one or more associated keywords are displayed in a list.

The interface component is further operative to receive an indication of a selection of a given keyword and filter the one or more content items displayed according to the selected keyword. According to one embodiment, the interface component is operative to remove the one or more content items displayed that are not associated with the selected keyword. According to another embodiment, the interface component is operative to display the one or more content items associated with the selected keyword at the top of a list of content items, or to otherwise distinguish the one or more content items associated with the selected keyword from the one or more content items not associated with the selected keyword.

According to one embodiment, the interface component is further operative to generate a user interface to display one or more buddies associated with the user. The user interface may display information associated with the one or more buddies and may filter the one or more buddies according to the selected keyword. Additionally, the interface component may display one or more content items and one or more associated keywords saved by the one or more buddies of the user.

BRIEF DESCRIPTION OF THE DRAWINGS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

DETAILED DESCRIPTION OF THE PREFERRED EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
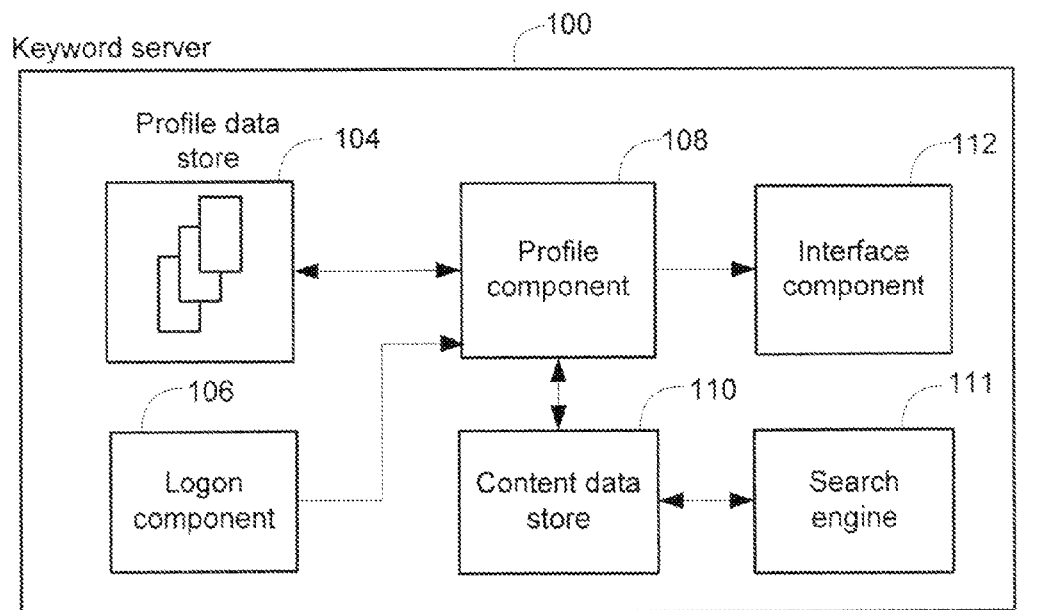
FIG. 1 is a block diagram illustrating one embodiment of a system for generating an interface that may be used to browse one or more saved content items associated with one or more user generated keywords according to one embodiment of the present invention.
Figure 1:
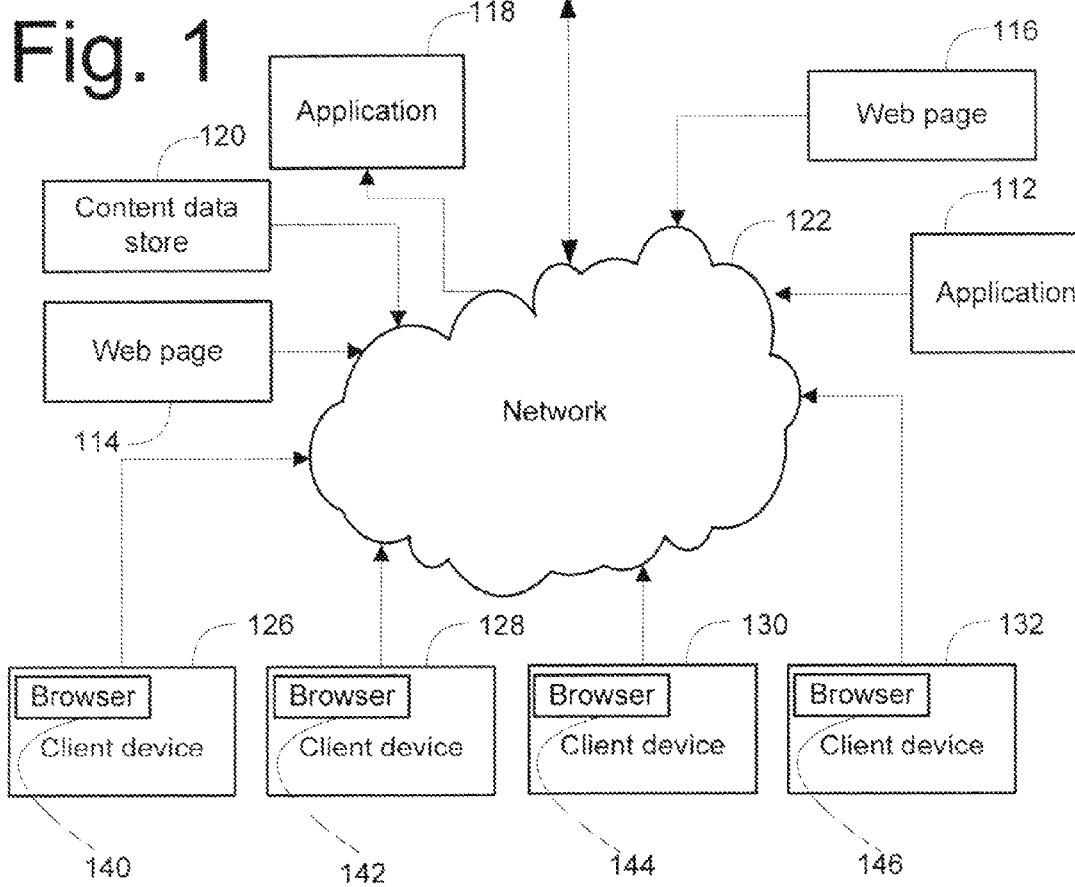

FIG. 1 presents a block diagram illustrating one embodiment of a system for generating an interface comprising one or more user generated keywords associated with one or more saved content items. According to the embodiment illustrated in FIG. 1, client devices 126, 128, 130, and 132 are communicatively coupled to a network 122, which may include a connection to one or more local and/or wide area networks, such as the Internet. According to one embodiment of the invention, a client device 124, 126 and 128 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A user of a client device 126, 128, 130, and 132 communicatively coupled to the network 122 may logon to a keyword server 100 via a logon component 106. The logon component 106 at the keyword server is operative to receive the credentials for a given user, which may comprise a username and password. The logon component 106 may deliver the credentials for a given user to a profile component 108 operative to search a profile data store 104 to retrieve the user profile associated with the credentials received by a given user. For example, the profile component 108 may perform a search of the profile data store 104 for a user profile associated with the username and password received by the logon component 106.

A user of a client device 126, 128, 130, and 132 may thereafter browse various content items available over the network. The user may utilize a search engine 111 at the keyword sever 100 to perform a search for one or more content items maintained in one or more local or remote content data stores 110 and 120, respectively. The user may also view one or more web pages 114 and 116 using a browser 140, 142, 144, and 146 maintained on the client device 126, 128, 130, and 132 associated with the user. Similarly, the user may interact with various applications 112 and 118 available to the user, such as instant messaging applications, peer-to-peer applications, social networking applications, etc.

While viewing or interacting with one or more content items available to the user, the user may choose to save one or more of the content items. For example, the user may locate a web page of interest and may wish to save the web page for access at a later date. Similarly, the user may locate an image or video file and may wish to save the content items for viewing at a later date. Additionally, the user may interact with a "buddy" via an instant messaging application and may wish to save information describing the buddy, such as a group to which the buddy belongs. According to one embodiment of the invention, saving a content item comprises selecting a "save this" button via a toolbar displayed on a user's client device 126, 128, 130, and 132, which may be an integral component of a browser 140, 142, 144, and 146 on the user's client device 126, 128, 130, and 132, or an application with which the user is interacting. Alternatively, or in conjunction with the foregoing, a toolbar may be displayed on a user's client device via a plug-in application. The plug-in application may be operative to receive information from a browser or other application with which the user interacts indicating that a given content item is to be saved. Those of skill in the art recognize various techniques for displaying a toolbar, button, etc., allowing a user to indicate that a given content item is to be saved.

When a user elects to save a given content item, a user is prompted to enter one or more keywords to be associated with the saved content item. As used herein, a "keyword," which may also be referred to as a "tag," can be one or more words that are provided by a user to describe a given content item. A user is advantageously permitted to choose any words or phrases as keywords to be associated with a given content item. For example, a user may choose to associate a given saved web page with the keywords "European news," a saved image with the keywords "favorite painting," a saved audio file with the keywords "Favorite Rolling Stones song," a particular buddy from an instant messaging application with the keywords "football buddy," etc.

The saved content item and the user-generated keywords associated with the saved content item are delivered via the network 122 to the profile component 108. The profile component 108 is operative to save a content item and the one or more user-generated keywords associated with the content item for a given user. According to one embodiment of the invention, the profile component generates an index for a given user comprising one or index entries, wherein a given index entry stores a saved content item or a reference to the saved content item and the one or more keywords associated with the saved content item. The index generated by the profile component 108 for a given user may be maintained in the user profile associated with the respective user.

According to one embodiment of the invention, the profile component 108 generates a copy of the content item to be saved for a given user and maintains the copied content item in a local 110 or remote 120 content data store. For example, a user may choose to save a particular web page, document, image, etc. The profile component 108 may create a copy of the web page, document, image, etc., and save the copied content item in local or remote content data stores 110 and 120. The index generated for a given user and maintained in the user's profile may contain the one or more keywords associated with the saved content item, as well as a reference to the saved content item in local or remote content data store 110 and 120. Local 110 and remote 120 content data stores are operative to maintain one or more saved content items associated with one or more users and may comprise one or more accessible memory structures such as a database, CD-ROM, tape, digital storage library, etc. Local and remote data stores 110 and 120 may be implemented as databases or any other type of storage structures capable of providing for the retrieval and storage of one or more saved content items for one or more users.

According to another embodiment of the invention, the profile component 108 maintains a reference to a saved content item. For example, instead of generating a copy of a web page, document, image, advertisement, etc., saved by a user, the profile component 108 may save the URL of the web page, document, image, advertisement, etc., along with the one or more user-generated keywords associated with the content item. The reference to a saved content item and the one or more keywords associated with the saved content item may be maintained in the index generated for a given user in the user's profile.

The profile of a given user maintained in the profile data store 104 may further specify one or more "buddies" or "friends" associated with the user. The buddies or friends of a given user who also maintain profiles on the keyword server 100 may be identified using various techniques, including but not limited to, explicit user identification of a buddy or friend, by reference to a social network to which a given user belongs, or by reference to a user's list of buddies maintained by one or more applications 112 and 118, such as an instant messaging application. For example, upon logging on the to the keyword server 100, the user may specify the one or more social networks to which he or she belongs or the one or more instant messaging applications with which he or she is registered. The user specified information may be used to identify the one or more buddies associated with the given user that maintain profiles on the keyword server 100.

A user of a client device 126, 128, 130, and 132 with a profile maintained by the keyword server 100 may communicate a request to the keyword server indicating a desire to browse content items previously saved by the user or the one or more buddies associated with the user that maintain profiles on the keyword server 100. The profile component 108 is operative to retrieve the profile of the user with which the request originated from the profile data store 104. The profile component 108 utilizes the information maintained in the profile of a given user to retrieve the content items and the one or more associated keywords saved by the respective user. For example, the abovementioned index maintained in the profile of a given user may be used to retrieve the one or more saved content items from local 110 and remote 120 content data stores. Similarly, the one or more references to saved content items, such as URLs, may be used to retrieve the one or more content items saved by a given user as indicated by the user's profile.

The one or more saved content items, keywords, and buddy information associated with a given user are delivered to an interface component 112. The interface component 112 is operative to generate an interface comprising the one or more saved content items and associated keywords, as well as the one or more buddies associated with a given user. According to one embodiment of the invention, the user interface initially presented to the user requesting saved content items comprises the one or more content items saved by the user and the one or more keywords associated with the content items. Additionally, the interface presented to the user comprises information regarding the one or more buddies associated with the user, as well as the one or more keywords associated with each respective buddy. The content items initially displayed to a user may be displayed randomly, in alphabetical order, according to size, according to the type of content item, according to the date on which the content items were saved, etc.

A user may interact with the interface generated by the interface component 112 in various ways, which may result in the filtering of content items displayed to the user. According to one embodiment, the user may select one or more keywords displayed in the interface generated by the interface component 112 using a selection device such as a mouse or a keyboard. When a user selects a given keyword, the one or more content items associated with the selected keyword may be filtered. For example, the one or more content items associated with the selected keyword may be displayed at the top of the list of content items, may be high-lighted, may be enlarged, etc., to distinguish the content items associated with the selected keyword from the one or more content items not associated with the selected keyword.

A user may select additional keywords, resulting in further filtering of the content items displayed to the user. For example, a user may be presented with a plurality of content items and keywords, such as "California," "Beaches," "News," and "Restaurants." The user may select a first keyword, such as "California," which may result in the one or more content items associated with the keyword "California," as indicated by the profile of the user, being displayed at the top of a ranked list of content items. The user may thereafter select a second keyword, such as "Beaches," which may result in the display of content items associated with both the keywords "California" and the keyword "Beaches," thus further filtering the content items displayed to the user.

The interface generated by the interface component 112 and displayed on a client device 126, 128, 130, and 132 of a given user may also incorporate one or more controls for interacting with the content. For example, a user may be presented with a control to delete content items previously saved by the user. Similarly a user may be presented with a control to email one or more content items to one or more destinations. Information regarding the interaction of a user with the content items displayed within the interface generated by the interface component 112 may be delivered to the profile component 108. The profile component 108 may update the profile of the given user to reflect the interaction. For example, if a given user deletes a saved content item using the controls within the interface generated by the interface component, information regarding the deleted item may be delivered to the profile component 108. The profile component 108 may thereafter update the user's profile, removing the saved content item from the index maintained in the profile associated with the user.

According to one embodiment of the invention, information regarding the selection of a given content item by the user is delivered to the profile component 108. The profile component 108 is operative to update the profile of the user to indicate the content item selected by the user. Information maintained in the profile of a given user may be used to deliver advertisements to the user. For example, the profile of a given user may indicate that the user frequently selects content items associated with a given keyword. The interface generated by the interface component 112 and displayed on the client device 126, 128, 130, and 132 of the user may incorporate one or more advertisements associated with keyword frequently selected by the user. The advertisements displayed on the client device 126, 128, 130, and 132 may be retrieved by the interface component 112 from one or more advertisement data stores (not illustrated).

A user of a client device 126, 128, 130, and 132 may also select one or more of the buddies associated with the user and displayed within the interface generated by the interface component 112. According to one embodiment of the invention, selection of a given buddy displayed within the interface generated by the interface component 112 results in the retrieval of the one or more content items saved by the selected buddy. For example, the profile component 108 may retrieve the profile associated with the buddy selected by the user. The profile of the selected buddy may be used to identify the one or more content items saved by the buddy. The content items saved by the buddy, as indicated by the profile associated with the buddy, may be delivered to the interface component 112 and displayed to the user so as to allow the user to view the one or more content items saved by the respective buddy.

While the embodiment presented in FIG. 1 illustrates the storage of content items in a keyword server 100, those of skill in the art recognize that saved content items, and the one or more user-generated keywords associated with saved content items, may be stored locally on a client device 126, 128, 130, and 132. For example, an index may be maintained on the client device 126, 128, 130, and 132 of a given user indicating the one or more items of content saved by the user, as well as the one or more user-generated keywords associated with the content item. Similarly, the abovementioned interface component may similarly be maintained on the client device 126, 128, 130, and 132 of a given user and used to generate an interface comprising the one or more items of content saved by a given user, as well the one or more corresponding user-generated keywords. Additionally, information regarding the one or more buddies associated with a given user may be stored locally on the client device 126, 128, 130, and 132 of a given user. The user, communicatively coupled to the network 122, may browse the one or more content items saved by the one or more buddies associated with user utilizing techniques recognized by those with skill in the art, such as a peer-to-peer network.

Figure 2:
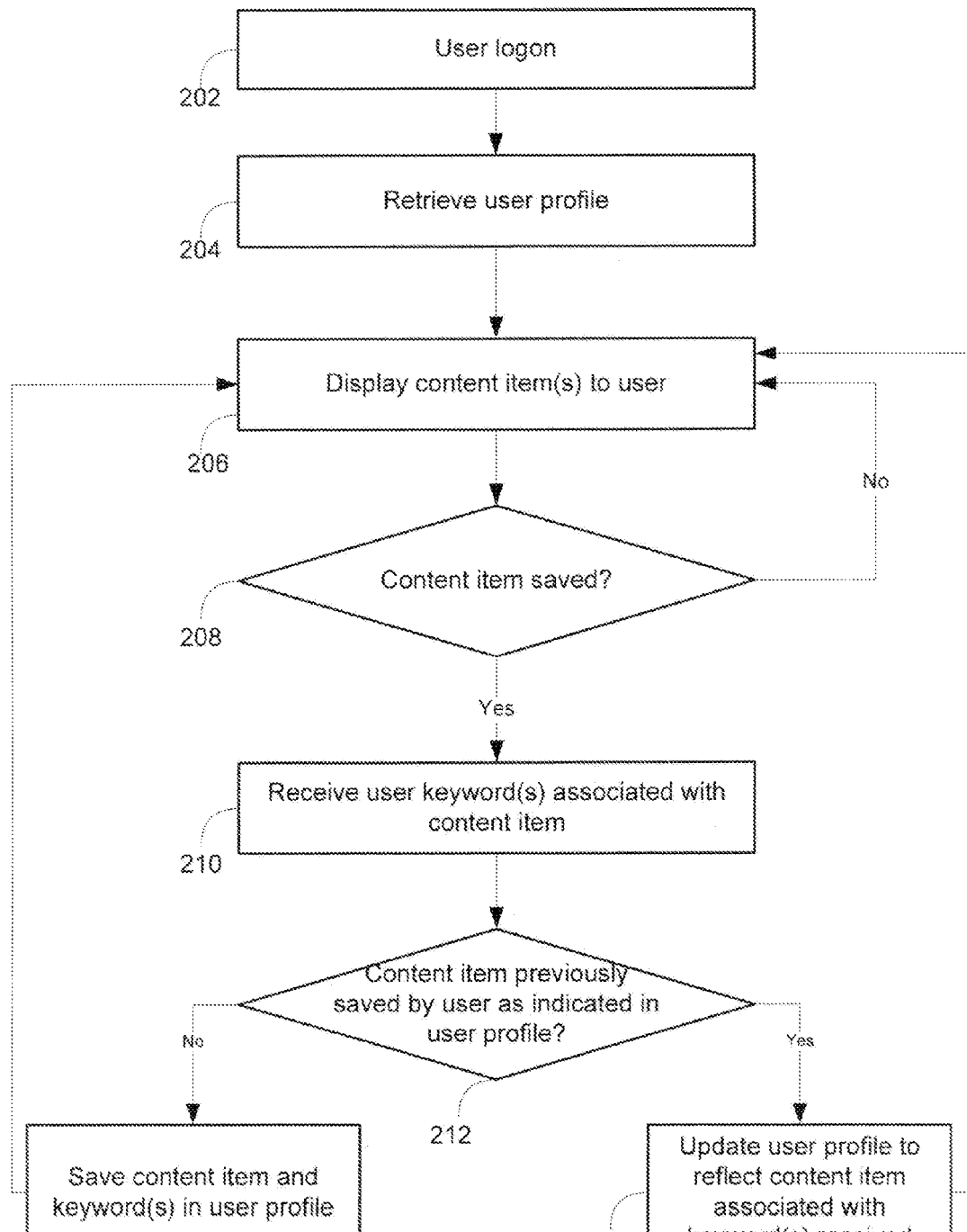
FIG. 2 is a flow diagram presenting a method for saving a content item associated with one or more user generated keywords according to one embodiment of the present invention.

FIG. 2 is a flow diagram presenting a method for saving a given content item associated with one or more user generated keywords. As illustrated in FIG. 2, a user of a client device may logon to a keyword server via a logon component, step 202. The credentials provided by the user to the logon component, such as a username and password, may be used to retrieve a profile associated with the user, step 204. The user of the client device may browse various types of local and remote content available to the user that are displayed on the user's client device, step 206. For example, using a browser, the user may browse the Internet, viewing various web pages, documents, advertisements, etc. Similarly, a user may interact with one or more applications available to the user, such as instant messaging applications, peer-to-peer networks, etc.

While interacting with one or more content items, the use may choose to save a given content item displayed to the user. For example, a user may wish to save a web page containing content of interest to the user. Similarly, the user may wish to save an audio or video file for access at a later date. Additionally, a user may wish to save information associated with a "buddy" with which the user interacts via an instant messaging application and that maintains a profile on the abovementioned keyword server. Saving a content item may be performed using the "save" functionality of an application or content item with which a user is interacting. For example, a user viewing a web page in a browser may select the "Save" button within the browser using a selection device such as a mouse or keyboard." Alternatively, or in conjunction with the foregoing, a separate toolbar may be presented to the user, which may include a "Save" button that the user may activate while browsing content displayed on the user's client device. Those of skill in the art recognize the plurality of techniques that may be used to save a content item displayed on a client device.

A check is performed to determine whether a user has chosen to save a given content item, step 208. If a user does not choose to save a content item, the user may continue to browse content available to the user and displayed on the user's client device, step 206. When a user elects to save a content item, a user is prompted to enter one or more keywords to be associated with the content item, step 210. The user-generated keywords may comprise one or more words that are provided by a user to describe a given content item. A user may choose any combination of words or phrases as keywords to be associated with a given content item. For example, a user may specify keywords that provide a description of the content item, such as the keyword "weather" for a web page providing weather forecasts, or "bicycling buddy" for an instant messaging buddy with whom the user shares a common interest in bicycling.

Using the information maintained in the profile associated with the user, a check is performed to determine the user has previously saved the content item, step 212. If the content item to be saved has been previously saved by the user, the profile associated with the user is updated to indicate that the content item is associated with the one or more keywords specified the user, step 214. If the user has not previously saved the content item, the content item and the one or more keywords associated with the content item, as specified by the user, are saved, step 216. According to one embodiment of the invention, saving a content item comprises generating a copy of the content item for storage and future retrieval. For example, saving a web page may comprise generating a copy of the HTML code comprising the web page, the one or more images displayed within the web page, etc. According to another embodiment of the invention, saving a content item comprises identifying a reference to the content item. For example, saving a web page may comprise saving the URL of the web page.

Figure 3:
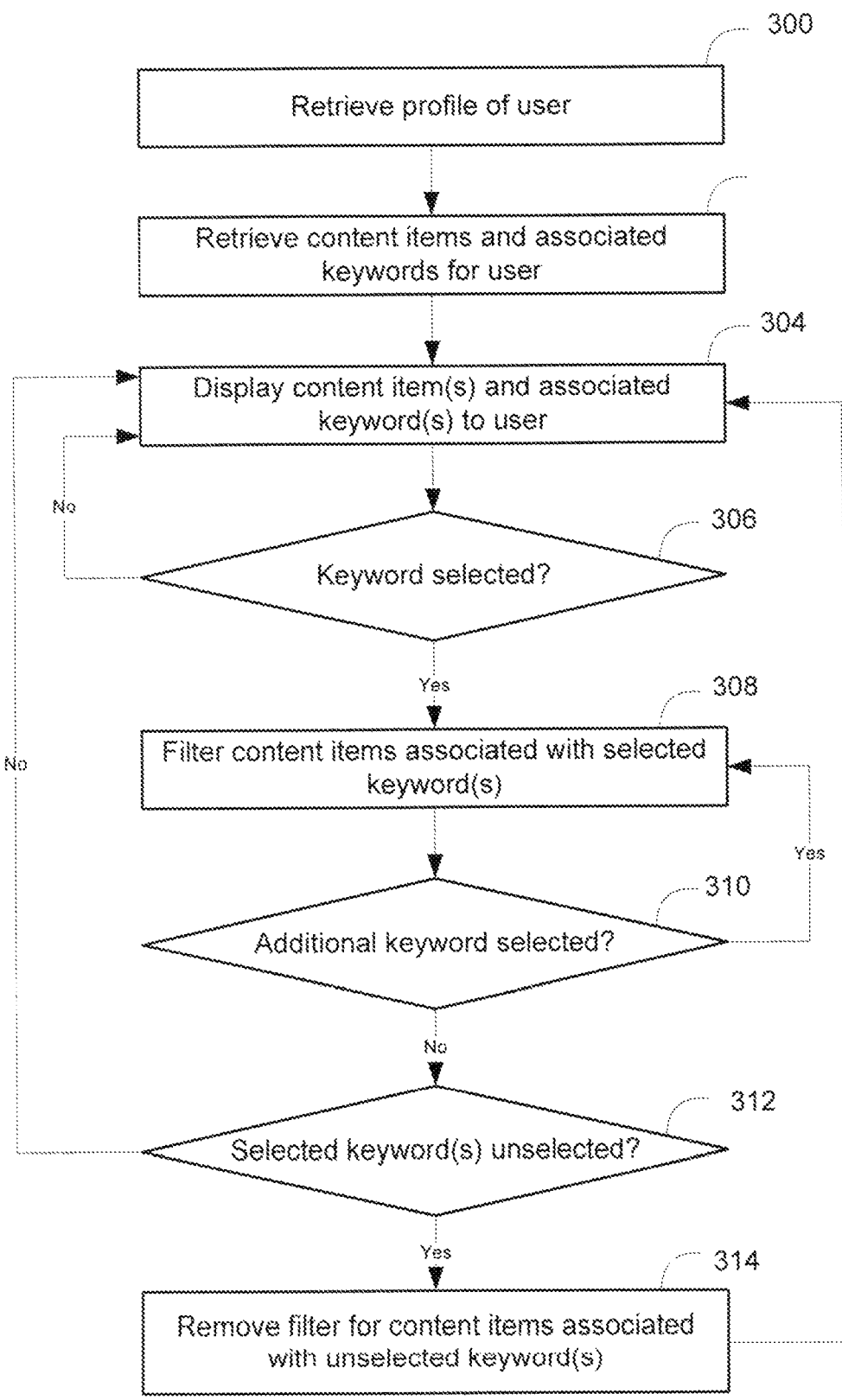
FIG. 3 is a flow diagram presenting a method for retrieving and displaying one or more saved content items associated with one or more user generated keywords according to one embodiment of the present invention.

FIG. 3 is a flow diagram presenting a method for retrieving and displaying one or more content items saved by a user, as well as the one or more user-generated keywords associated with the saved content items. According to the embodiment illustrated in FIG. 3, the profile of a user is retrieved, step 300, and used to retrieve the one or more content items and keywords associated with the content items, as specified in the user's profile, step 302. The one or more content items and the one or more keywords associated with the content items are displayed to the user on the user's client device, step 304.

The user may view the various content displayed on the user's client device and may also select a keyword associated with the one or more content items displayed in order to locate one or more content items. A check is performed to determine whether the user has selected a keyword associated with a displayed content item, step 306. If a user does not select a keyword associated with a content item, the user may continue to browse the content displayed on the user's client device, step 304.

When a user selects a keyword associated with a content item, the one or more content items displayed to the user are filtered according to the selected keyword, step 308. According to one embodiment of the invention, filtering the content items comprises displaying the one or more content items associated with the selected keyword at the top of a ranked list of content items. Alternatively, or in conjunction with the foregoing, filtering the content items comprises high-lighting or otherwise distinguishing the one or more content items associated with the selected keyword from the one or more content items not associated with the selected keyword. According to a further embodiment of the invention, filtering the content items comprises removing the one or more content items not associated with the selected keyword from the one or more content items displayed to the user.

A user may continue to select one or more keywords associated with the one or more content items displayed to the user. A check is performed to determine whether the user selected one or more additional keywords, step 310. If additional keywords are selected, the content items displayed to the user are further filtered, step 308. For example, a user may initially be presented with several content items associated with various keywords, such as "Laptop computers," "Weather forecast," "San Francisco Restaurants," "pizza,"

"California beaches," "movie theaters," etc. A user may select a first keyword associated with the content items, such as "California beaches," resulting in the filtering of the one or more content items associated with the keyword "California beaches." Thereafter, a user may select additional keywords, such as "Weather forecast." The one or more content items displayed to the user may be further filtered, resulting in the one or more content items associated with both the keywords "California beaches" and "Weather forecast" being displayed to the user at the top of a ranked list of content items, highlighted, etc.

If additional keywords are not selected, a check is performed to determine whether one or more selected keywords have been unselected by the user, step 312. If one or more keywords are not unselected, the user may continue to browse the content items displayed to the user, step 304. When one or more selected keywords are unselected, the filter applied to the content items displayed to the user is removed with respect to the unselected keyword, step 314. For example, a user may have selected the keywords "San Francisco Restaurants," and the keyword "pizza," resulting in the filtering of the one or more content items associated with the selected keywords, such as the removal of the one or more content items not associated with both "San Francisco Restaurants" and "pizza." Thereafter, the user may unselect the keyword "pizza," resulting in the removal of the filter for the one or more content items associated with both the keywords "San Francisco Restaurants" and "pizza," and filtering according to only the keywords "San Francisco Restaurants." A user may thereafter continue to browse the content displayed on the user's client device, step 304, and select one or more keywords to locate items of content, step 306.

Figure 4:
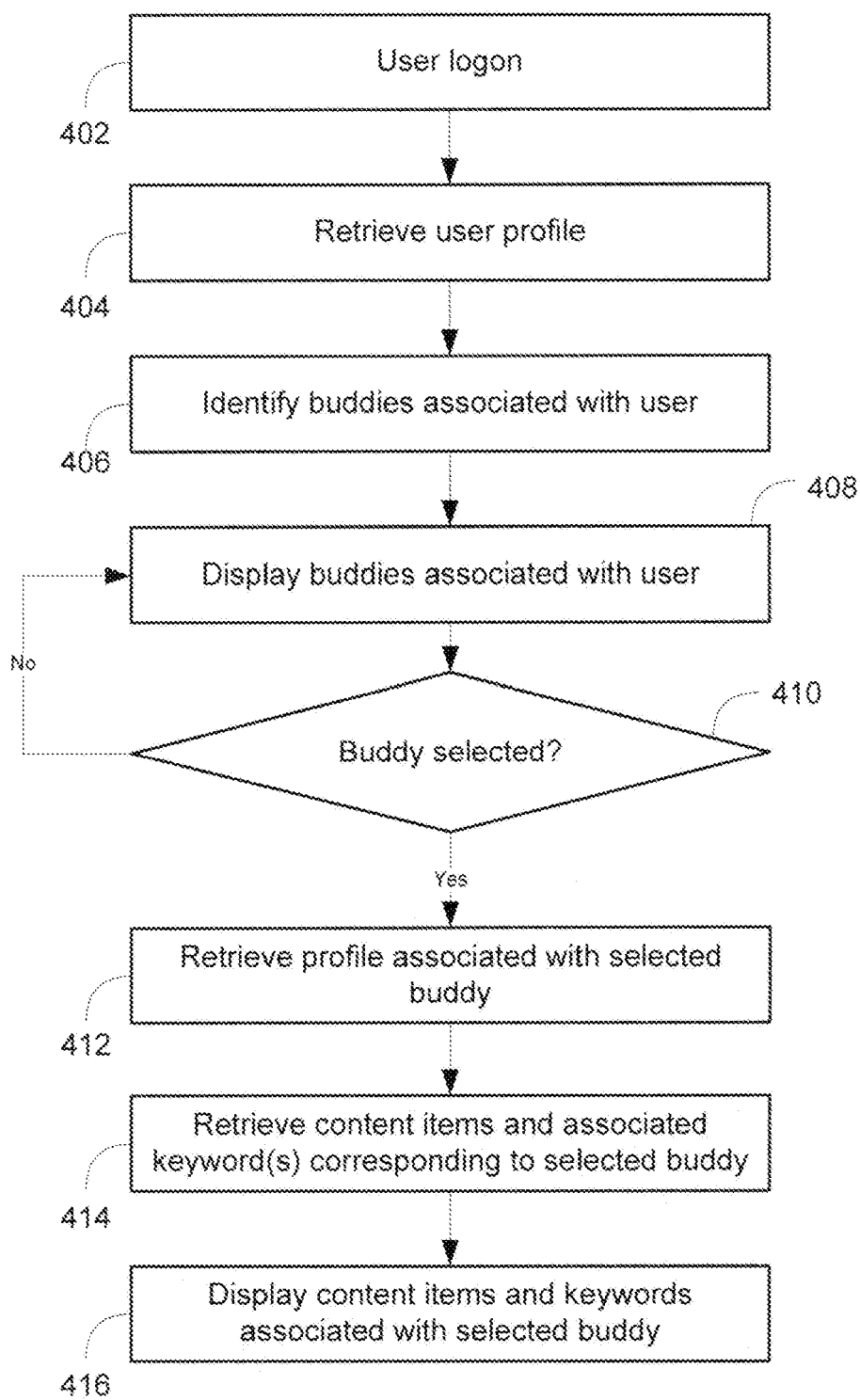
FIG. 4 is a flow diagram presenting a method for retrieving and displaying one or more content items saved by one or more buddies associated with a given user according to one embodiment of the present invention.

FIG. 4 is a flow diagram illustrating one embodiment of a method for displaying the one or more content items saved by the one or more buddies associated with a given user. A user of a client device may logon to a keyword server via a logon component, providing user credentials such as a username and password, step 402. The credentials of the given user are used to retrieve the profile associated with the user, step 404. The profile of the user is used to identify the one or more buddies associated with the user, step 406. For example, the profile may contain information identifying the one or more buddies of the user, as specified by the user. Similarly, the profile may contain information specifying the one or more social networks to which the user belongs, or one or more instant messaging applications with which the user interacts, which may be used to ascertain the buddies associated with a given user.

The one or more buddies associated with a given user are displayed to the user on the user's client device, step 408. The one or more buddies associated with a given user may be displayed according to the one or more keywords associated with each respective buddy. For example, as previously described, a user may save one or more keywords describing the buddy, such as "bicycling buddy," "football buddy," "buddy in California," etc. The one or more buddies associated with the user may be displayed according to the keywords associated with the one or more buddies, such as displaying the one or more buddies associated with the keywords "bicycling buddy" together.

A check is performed to determine whether the user has selected one or more of the buddies displayed to the user, step 410. If the user does not select a buddy, the user may continue to browse the one or more buddies associated with the user and displayed on the user's client device, step 408. If the user selects a buddy displayed on the user's client device, the profile of the selected buddy is retrieved, step 412. The profile of the selected buddy is used to retrieve the one or more content items saved by the selected buddy, as well as the one or more keywords associated with the content items saved by the selected buddy, step 414. The one or more content items saved by the selected buddy, as well as the one or more keywords associated with the buddy's saved content items are displayed to the user on the user's client device, step 416. A user may interact with the keywords and content items displayed according to the methods described herein. For example, a user may select one or more of the keywords displayed in order to locate a particular content item. Similarly, the user may browse, email, etc., the one or more content items displayed to the user.

Figure 5:
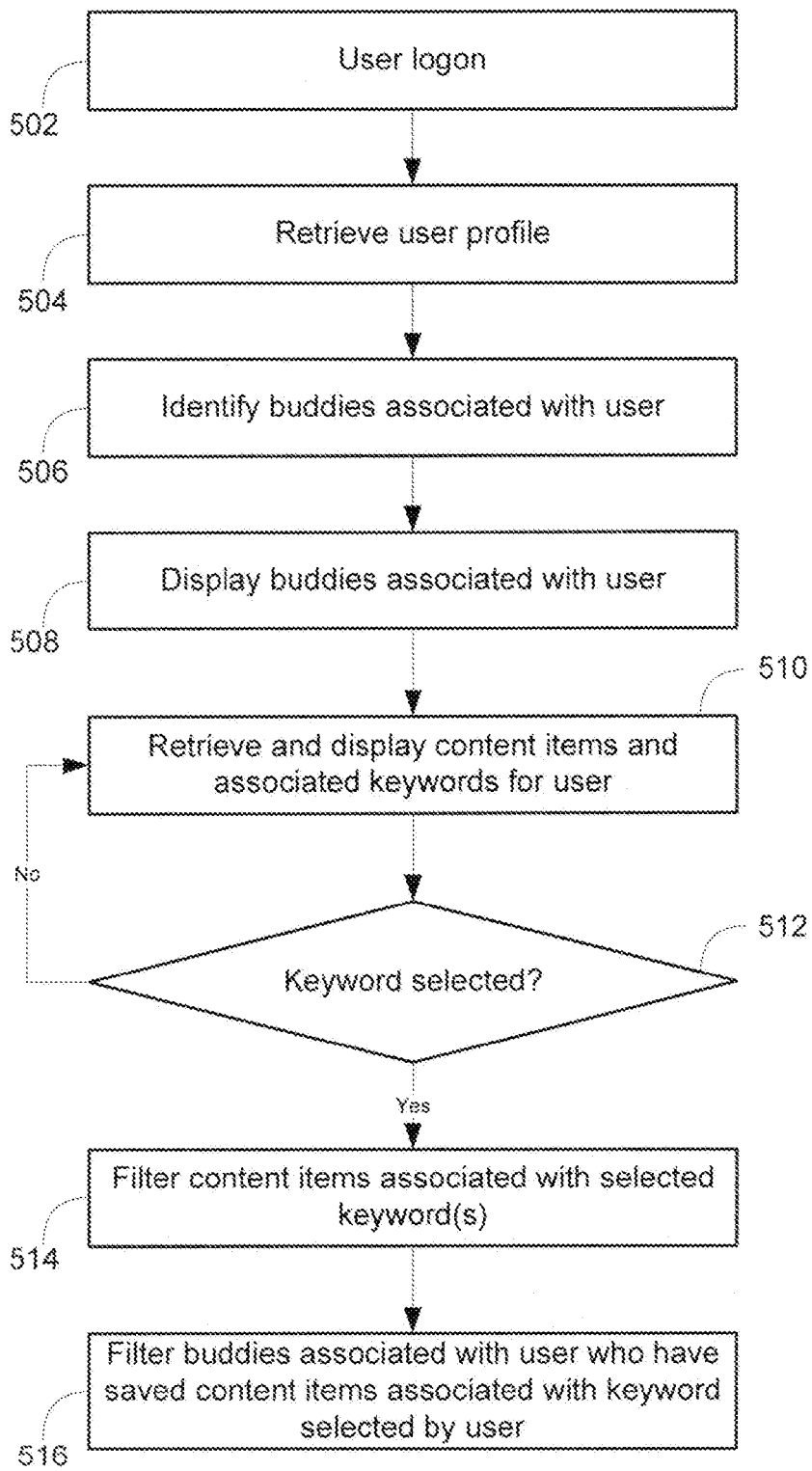
FIG. 5 is a flow diagram presenting a method for displaying and filtering one or more saved content items and the one or more buddies displayed to a user according to one embodiment of the present invention.

FIG. 5 is a flow diagram illustrating one embodiment of a method for displaying and filtering the content items associated with the one or more buddies of a given user. A user may logon to a keyword server via a logon component, step 502, providing a username and password, or other information identifying the user. The credentials of the user are used in order to retrieve the user's profile, step 504. The one or more buddies associated with the user, as indicated in the user's profile, are identified, step 506. The one or more identified buddies are thereafter displayed to the user on the user's client device, step 508. According to one embodiment of the invention, the one or more buddies displayed on the user's client device are displayed according to the one or more keywords with which the one or more buddies are associated. For example, one or more buddies may be associated with the keyword "doctor," as specified in the user's profile, and may be displayed in a "doctors" category. Similarly, one or more buddies may be associated with the keywords "jogging buddy" and displayed in a "jogging buddies" category.

The one or more content items and associated keywords, as specified in the user's profile, are retrieved and displayed on the user's client device in conjunction with the one or more buddies associated with the user, step 510. The one or more content items may be displayed in any order, such as randomly, in alphabetical order, etc. Similarly, the one or more keywords associated with the one or more content items, as indicated in the user's profile, may be displayed in various ways, such as alphabetically, according to the number of content items associated with a given keyword, randomly, etc.

A user may browse the various content items displayed on the user's client device and may also select one or of the displayed keywords using a selection device such as a mouse or a keyboard. A check is performed to determine whether the user selects a keyword, step 512. If the user does not select a keyword, the user may continue to view the content items displayed on the client device, step 510. If the user selects a keyword, the one or more content items displayed to the user are filtered according to the selected keyword, step 514. For example, the one or more content items associated with the selected keyword, as indicated in the user's profile, may be distinguished from the one or more content items displayed to the user, such as high-lighting, bolding, etc., the one or more content items associated with the selected keyword. Alternatively, or in conjunction with the foregoing, the one more content items not associated with the selected keyword may be removed from the content items displayed to the user, thus resulting in the display of only the one or more content items associated with the selected keyword.

Additionally, the one or more buddies associated with the user are filtered according to the selected keyword, step 516. According to one embodiment of the invention, filtering the one or more buddies associated with the user according to the keyword selected comprises identifying the one or more buddies who saved one or more content items with tags or keywords matching the keyword selected by the user. For example, the user may select the keyword "Restaurants," resulting in the filtering of the one or more content items associated with the selected keyword. Thereafter, the one or more buddies associated with user that saved one or more content items with the corresponding tag or keyword "Restaurants" are identified.

Figure 6:
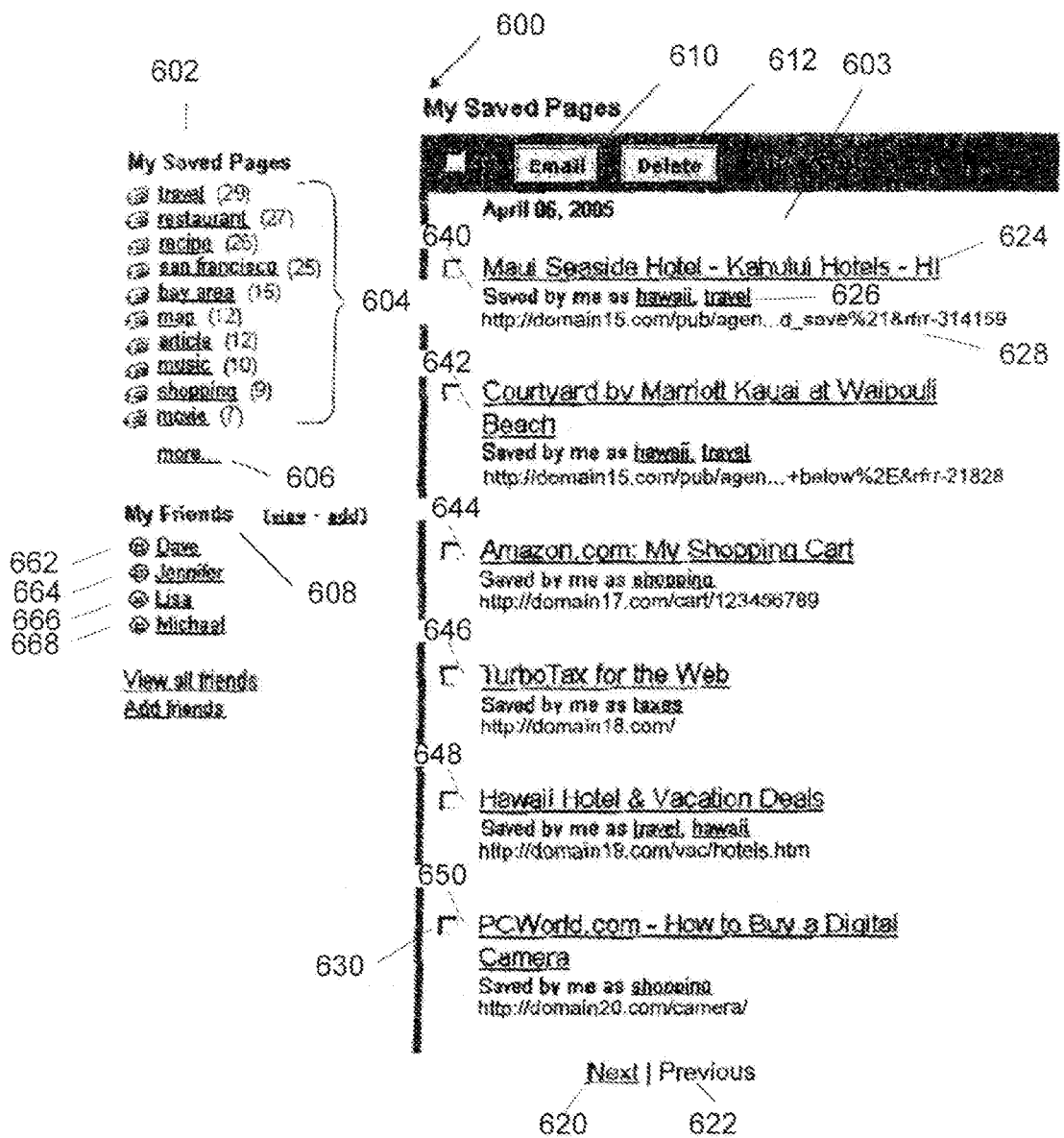
FIG. 6 is a screen diagram illustrating a user interface that may be displayed at a first stage of a keyword-space navigation operation according to one embodiment of the present invention.

FIG. 6 is a screen diagram illustrating one embodiment of a user interface that may be generated for a given user who has saved one or more content items associated with one or more keywords. The screen diagram illustrated in FIG. 6 may be displayed, e.g., in a Web browser of generally conventional design that receives information from various servers, including the abovementioned keyword server that stores saved content items and associated keywords for one or more users. The screen diagram illustrated in FIG. 6 may comprise the content displayed to a user when the user first communicates a request to the above-mentioned keyword server a desire to browse the user's previously saved content items. For example, a button on the user's Web browser or within a toolbar displayed on the user's client device may be provided to allow the user to request the content previously saved by the user and to view the content in the user interface 600 illustrated in FIG. 6.

As illustrated in the screen diagram in FIG. 6, a navigation pane 602 and a content pane 603 are displayed to a given user. The navigation pane 602 includes a list of the one or more keywords 604 that the user has associated with the one or more saved content items 640, 642, 644, 646, 648, and 650 displayed within the content pane 603. In the embodiment illustrated in FIG. 6, the keywords 604 associated with the content items 640, 642, 644, 646, 648, and 650 in the content pane 603 are sorted according to frequency of use, however other orderings, (e.g., alphabetical or random) may be substituted. The list of keywords 604 associated with the one or more content items 640, 642, 644, 646, 648, and 650 saved by the user may be abbreviated with a "more . . . " button or link 606 allowing the user to view the remaining keywords with which the user associated one or more content items. For example, a user may have saved several hundred content items associated with several hundred keywords. The one or more keywords 604 most frequently used by the user, or used greater than a given frequency threshold, may be displayed within the navigation pane 602, whereas the remaining keywords 604 may be accessed by selecting the "more . . . " button or link 606.

In addition to the one or more keywords 604 associated with the one or more content items 640, 642, 644, 646, 648, and 650 displayed in the content pane 603, the navigation pane further includes the one or more "friends" or "buddies" 662, 664, 666, and 668 associated with the user. The "My Friends" section 608 of the navigation pane 602 lists the one or more friends 662, 664, 666, and 668 associated with the user that have saved one or more content items, allowing the user to browse the one or more content items saved by the one or more friends of the user. Additionally, the user may elect to view the content items saved by a particular friend by selecting a friend from the one or more friends 662, 664, 666, and 668 displayed in the "My Friends" section 608. Selection of a given friend from the list of friends 662, 664, 666, and 668 may result in the one or more content items saved by the selected friend being displayed within the content pane 603.

The content pane 603 lists the one or more content items 640, 642, 644, 646, 648, and 650 saved by a given user. If the list of the one or more content items 640, 642, 644, 646, 648, and 650 saved by a given user does not fit within the display area of the user's client device, the list can be partitioned into one or more pages. The user may view the list of one or more pages by selecting the "Next" 620 and "Previous" 622 controls or other suitable controls for navigating among one or more lists of content items. According to the embodiment illustrated in FIG. 6, the one or more content items 640, 642, 644, 646, 648, and 650 displayed within the content pane 603 are listed according to the order in which the one or more content items 640, 642, 644, 646, 648, and 650 were saved, with the most recently saved content item displayed first in a ranked list of content items 640, 642, 644, 646, 648, and 650. Other techniques may be used to order the one or more content items 640, 642, 644, 646, 648, and 650 saved by the user, such as alphabetical, random, etc.

A toggle button adjacent to the one or more content items 640, 642, 644, 646, 648, and 650 displayed within the content pane 603 allows a user to select one or more content items in order to perform one or more functions, such as emailing a content item or deleting a content item. As illustrated in FIG. 6, a user may select a toggle button 630 associated with a given content item 650 and may email the content item by selecting the email button 610 displayed within the user interface. Similarly, a user may select the toggle button 630 associated with a content item 650 and may delete the content item by selecting the delete button 612 displayed within the user interface 600.

The one or more content items 640, 642, 644, 646, 648, and 650 displayed within the content pane 603 are displayed with the title 624 associated with the respective content item. In the screen diagram illustrated in FIG. 6, the one or more content items 640, 642, 644, 646, 648, and 650 are further displayed with a reference to the content item 628 comprising a URL that may be selected by a user, redirecting the user to the content item associated with the URL selected.

Additionally, the one or more content items 640, 642, 644, 646, 648, and 650 displayed within the content pane 603 are displayed in conjunction with the one or more keywords 626 associated with the content item as specified by the user. The one or more keywords 626 may comprise hyperlinks or other similar controls allowing the user to select a given keyword, resulting in the filtering of content items according to methods described herein. For example, a user may select the "travel" keyword associated with content item 640. Selection of the "travel" keyword may result in the one or more content items associated with the keyword "travel" being displayed within the content pane 603. Alternatively, or in conjunction with the foregoing, the one or more content items not associated with the keyword "travel" may be removed from the content pane 603.

Figure 7:
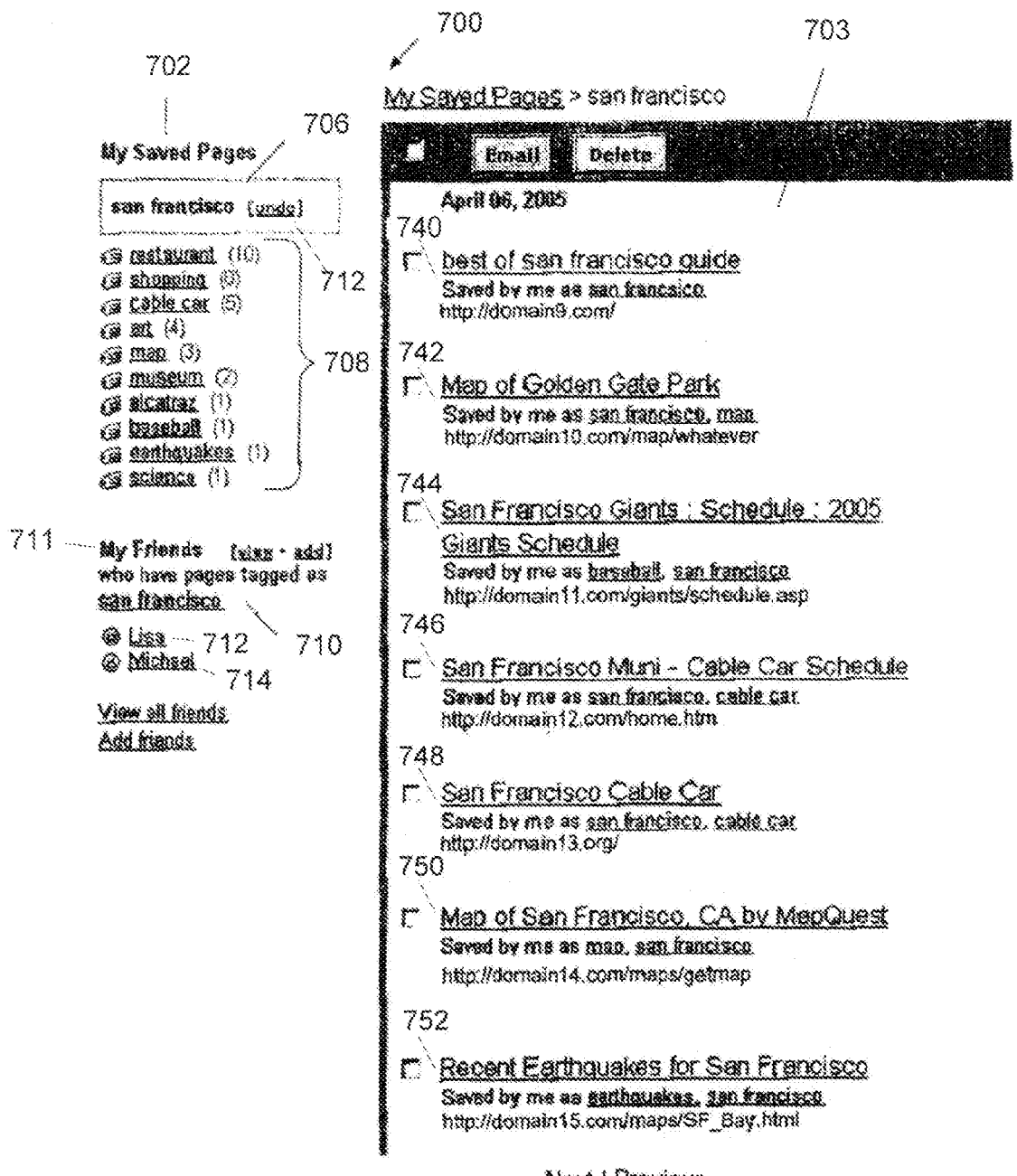
FIG. 7 is a screen diagram illustrating a user interface displaying one or more content items that may be filtered based upon the selection of a keyword according to one embodiment of the present invention.

A user may iteratively select one or more keywords that appear in conjunction with a given content item 640, 642, 644, 646, 648, and 650 within the content pane 603. The process of iteratively selecting keywords and filtering content items 640, 642, 644, 646, 648, and 650 may also be referred to as "navigating" or "browsing" the keyword space. At each stage of the navigation or browsing process, the navigation pane 602 is updated to reflect the current filter (selected keyword), the one or more keywords that have not been selected by the user, as well as one or more controls for removing a given filter. FIG. 7 illustrates one embodiment of a screen diagram that may be presented to a user upon the selection of a given keyword.

As illustrated in the screen diagram in FIG. 7, the keyword "San Francisco" has been selected from the list of keywords 708 displayed within the navigation pane 702 of the user interface 700. The keyword "San Francisco" is displayed within a filter box 706 that displays the one or more keywords selected by a user with which the content items displayed within the content pane 703 are filtered. The filter box 706 includes an "undo" control 712 allowing a user to remove or unselect one or more of the keywords previously selected by the user.

The list of keywords 708 displayed within the navigation pane 702 comprises the one or more keywords assigned by the user to the one or more content items 740, 742, 744, 746, 748, 750, and 752 saved by the user. Additionally, the one or more friends 712 and 714 associated with the user are displayed within the "My Friends" 711 section of the navigation pane 702.

The content pane 703 comprises the one or more content items 740, 742, 744, 746, 748, 750, and 752 saved by the user, filtered according to the one or more selected keywords displayed within the filter box 706. According to the screen diagram illustrated in FIG. 7, the content items 740, 742, 744, 746, 748, 750, and 752 displayed within the content pane are filtered according to the selected keywords "San Francisco" displayed in the filter box 706. The content items 740, 742, 744, 746, 748, 750, and 752 displayed to the user within the content pane 703 are displayed in conjunction with the one or more keywords with which the content items 740, 742, 744, 746, 748, 750, and 752 are associated. For example, content item 742 is displayed in conjunction with the keywords "San Francisco" and "map."

In addition to viewing the one or more saved content items 740, 742, 744, 746, 748, 750, and 752 associated with a given keyword, a user may also view the one or more friends 712 and 714 associated with the user who have saved content pages associated with the one or more keywords selected by the user. For example, according to the user interface 700 illustrated in FIG. 7, the one or more friends 712 and 714 that saved one or more content items associated with the keywords "San Francisco" are displayed within the "My Friends" section 710 of the navigation pane 702. The user may select a given friend 712 and 714 to browse the content items saved by the selected friend 712 and 714. Alternatively, or in conjunction with the foregoing, the user may select the "San Francisco" link 710 displayed within the "My Friends" section 711 to retrieve the one or more content items saved by the one or more friends 712 and 714 with saved content items associated with the keyword selected by the user.

A user presented with the user interface 700 illustrated in FIG. 7 may continue to select additional keywords 708 displayed within the navigation pane 702. Selection of additional keywords 708 may result in the further filtering of the one or more content items 740, 742, 744, 746, 748, 750, and 752 displayed within the content pane 703. Additionally, selection of additional keywords 708 may result in the further filtering of the one or more friends 712 and 714 associated with the user.

Figure 8:
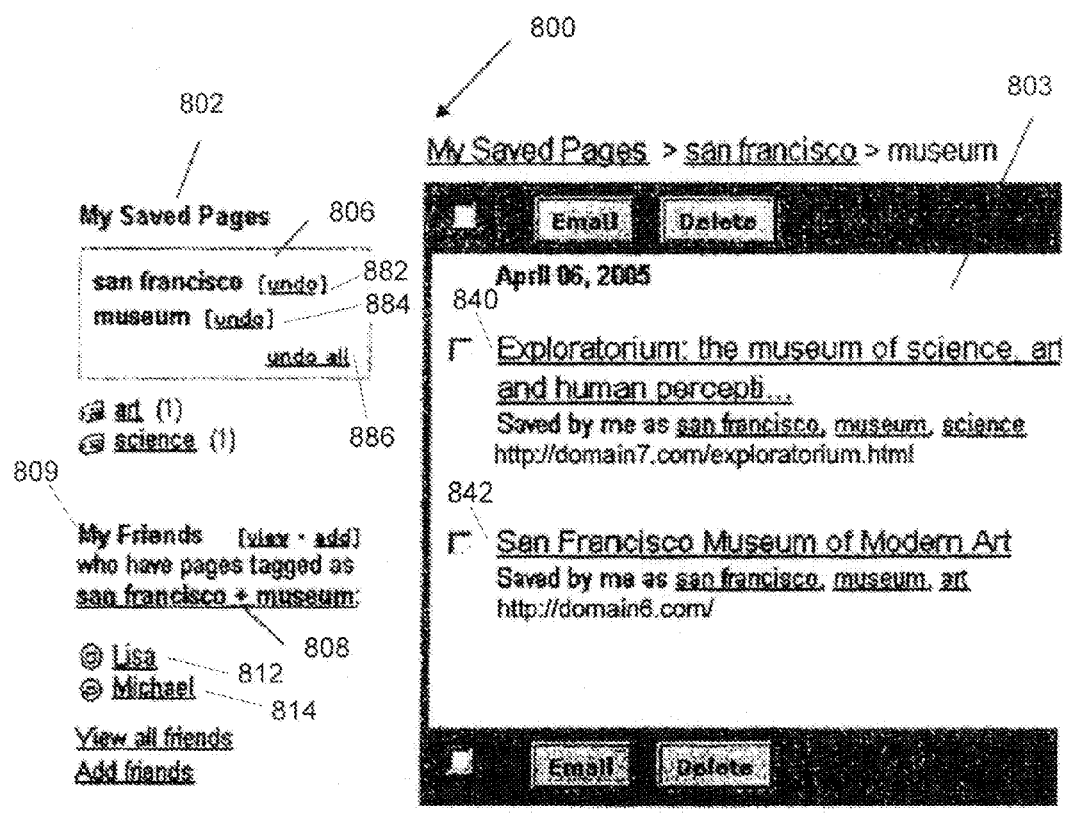
FIG. 8 is a screen diagram illustrating a user interface displaying one or more content items that may be filtered based upon the selection of a plurality of keywords according to one embodiment of the present invention.

FIG. 8 is a screen diagram illustrating the user interface 800 displayed to a user upon selecting an additional keyword from the one or more keywords displayed to the user in the screen diagram illustrated in FIG. 7. The filter box illustrated in FIG. 8 is updated to reflect the selection of both the keywords "San Francisco" and "museum." Additionally, the content pane 803 is updated to reflect the one or more content items 840 and 842 that are associated with the keywords "San Francisco" and "museum."

The one or more friends 812 and 814 of the user that have saved one or more content items associated with the keywords selected by the user are displayed to the user within the navigation pane 802 in the "My Friends" section 809. The user may select a friend from the one or more friends 812 and 814 displayed to the user to browse the content items saved by the selected friend. Alternatively, or in conjunction with the foregoing, the user may select the "San Francisco+museum" link 808 displayed within the "My Friends" section 809 to retrieve the one or more content items saved by the user's one or more friends 812 and 814 associated with the keywords selected by the user.

The filter box 806 within the navigation pane 802 advantageously provides a user with "undo" controls 882, 884, and 886 allowing the user to unselect one or more selected keywords. For example, the user may wish to remove the filter applied to the content items 840 and 842 for the keyword "museum." By selecting the "undo" control 884 associated with the "museum" keyword, the filter for the keyword "museum" is removed, thereby resulting in the filtering of the content items 840 and 842 using only the keyword "San Francisco." The user may also choose to remove the one or more filters applied to the content items 840 and 842 by selecting the "undo all" control 886, resulting in all of the one or more content items 840 and 842 saved by the user being displayed within the content pane 803.

Additionally, removing a given selected keyword from the filter box 806 via the "undo" controls 882, 884, and 886 results in the one or more friends associated with the user being unfiltered accordingly. For example, the friends 812 and 814 associated with the user illustrated in FIG. 8 are filtered according to the keywords "San Francisco" and "museum." Removal of the keyword museum from the filter box 806 via the "undo" control 884 may result in the filtering of the one or more friends associated with the user according to only the keyword "San Francisco."

Figure 9:
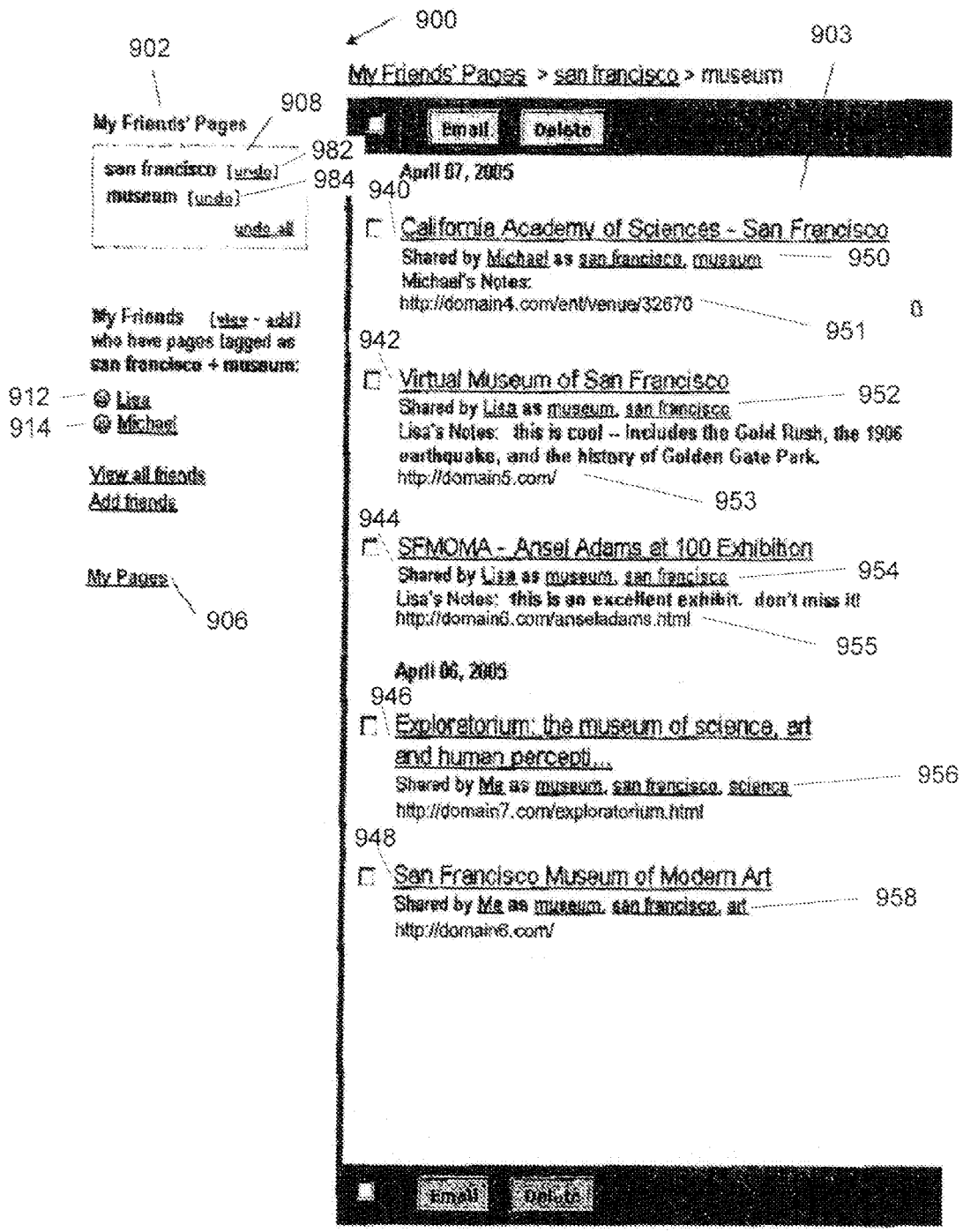
FIG. 9 is a screen diagram illustrating a user interface displaying one or more content items that may be filtered based upon the selection of one or more keywords associated with one or more buddies of a given user according to one embodiment of the present invention.

FIG. 9 is a screen diagram illustrating one embodiment of the interface presented to a user upon selection of the "San Francisco+museum" control 808 displayed within the "My Friends" section 809 illustrated in FIG. 8. The content pane 903 is updated to reflect the one or more content items 940, 942, and 944 saved by the one or more friends 912 and 914 of the user, as well as the one or more content items 946 and 948 saved by the user that are associated with the keywords selected by the user. The keywords selected by the user are displayed within the filter box 908 of the navigation pane 902.

The one or more content items 940, 942, 944, 946, and 948 saved by the user and the user's one or more friends 912 and 914 that are associated with the keywords selected by the user are displayed with an indication 950, 952, 954, 956, and 958 of the user that saved the respective content item 950. For example, content item 940 is displayed in conjunction with information 950 indicating that the item is "Shared by Michael." Similarly, content items 946 and 948 are displayed in conjunction with information 956 and 958 indicating that the user ("Me") saved the content items.

The one or more content items 940, 942, and 944 saved by the user's one or more friends 912 and 914 may be displayed with comments or notes 951, 953 and 955 provided by the respective friend indicating the friend's opinion, review, etc., of a given content item 940, 942, and 944. For example, content item 944, saved by "Lisa" is displayed with the comment 955 "this is an excellent exhibit. don't miss it!" The user may review the comments 951, 953, and 955 provided the user's one or more friends 912 and 914 to determine the content items the user wishes to review.

Figure 10:
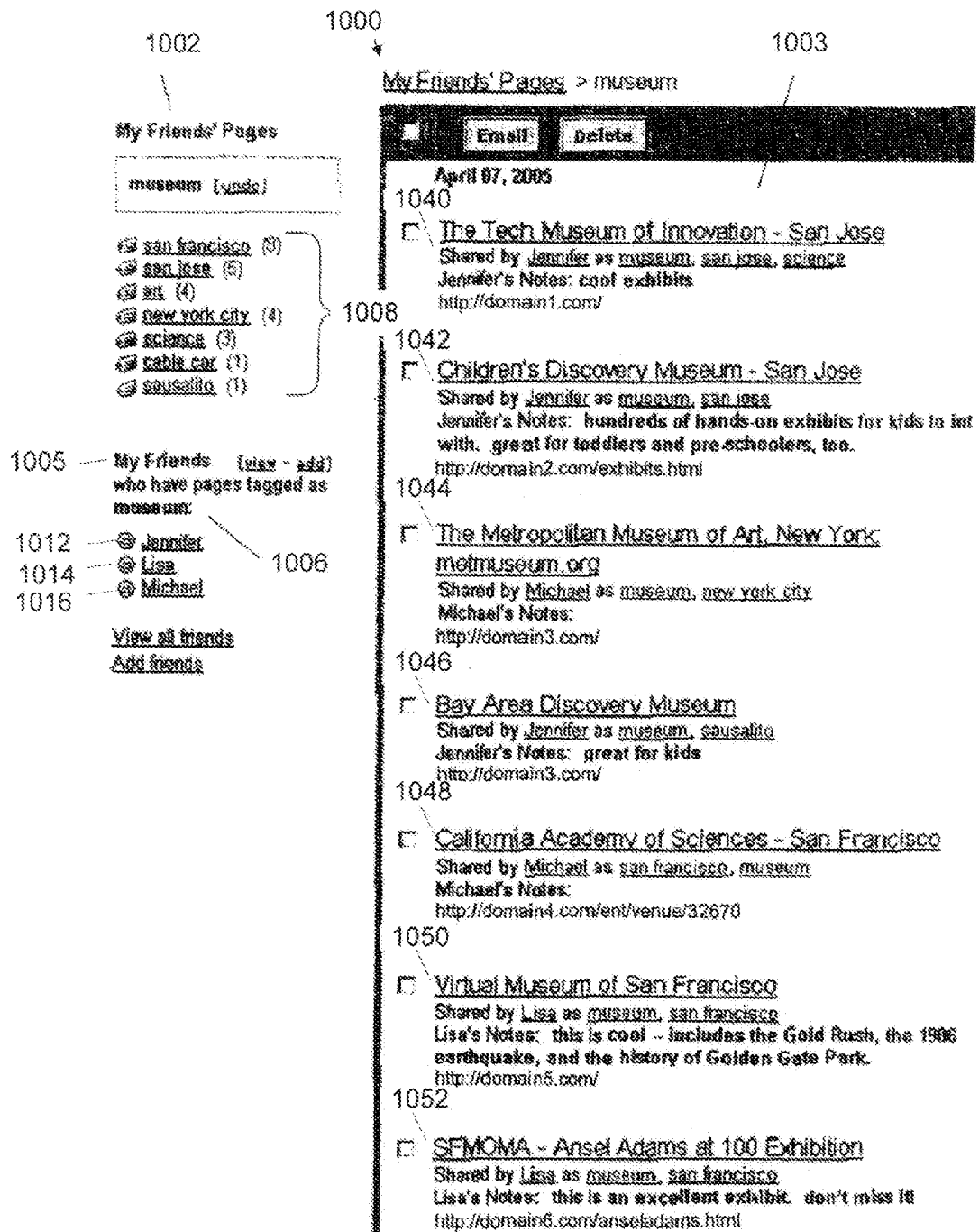
FIG. 10 is a screen diagram illustrating a user interface displaying one or more content items that may be displayed when a selected keyword is unselected according to one embodiment of the present invention.

The filter box 908 allows the user to remove one or more of the selected keywords via the "undo" controls 982 and 984. FIG. 10 is a screen diagram illustrating the interface 1000 presented to a user upon the removal of the keyword "San Francisco" from the filter box presented in FIG. 9. As illustrated in the screen diagram in FIG. 10, the content pane 1003 is updated to reflect the one or more content items 1040, 1042, 1044, 1046, 1048, 1050, and 1052 associated with only the keyword "museum" as saved by the user and the one or more friends of the user. Additionally, one or more keywords 1008 are displayed within the navigation pane 1002 comprising the one or more keywords with which the content items 1040, 1042, 1044, 1046, 1048, 1050, and 1052 displayed may be filtered.

The navigation pane 1002 is also updated to indicate the one or more friends 1012, 1014, and 1016 that have saved one or more content items associated with the keyword "museum" 1006. As previously described, the user may filter the one or more content items 1040, 1042, 1044, 1046, 1048, 1050, and 1052 displayed within the content pane 1003 by selecting one or more of the keywords 1008. Alternatively, or in conjunction with the foregoing, the user may select one or more of the friends 1012, 1014, and 1016 displayed within the "My Friends" section 1005 of the navigation pane 1002. Additionally, the user may remove the keyword "museum" from the filter box to view all of the one or more content items saved by the user and the user's one or more friends.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention and various embodiments with various contemplated. Thus, the foregoing limit the invention to the precise forms that many modifications and variations.

We claim:

1. A computerized method for browsing a collection of content items, the method comprising:
    saving, in a data storage device, one or more content items and one or more associated keywords, a given one of the one or more content items and one or more associated keywords specified by a user or one or more buddies associated with the user, wherein the user and the one or more buddies belong to one or more common social networks;
    generating, using a computing device, an interface that displays the one or more saved content items and the one or more associated keywords saved by the one or more buddies;
    generating an interface that displays the one or more buddies associated with the user;
    filtering, using the computing device, the one or more displayed content items according to a keyword selected by the user; and
    filtering the one or more displayed buddies associated with the user according to the selected keyword.

2. The method of claim 1 wherein the one or more content items include one or more instant messages.

3. The method of claim 1 wherein the one or more content items include one or more email messages.

4. The method of claim 1 wherein the one or more content items include one or more tagged documents.

5. The method of claim 4 wherein the one or more tagged documents are tagged by the user.

6. The method of claim 4 wherein the one or more tagged documents are tagged by the one or more buddies.

7. The method of claim 1 wherein saving one or more content items comprises saving a copy of a given content item.

8. The method of claim 1 wherein saving one or more content items comprises saving a reference to a given content item.

9. The method of claim 1 wherein generating an interface comprises generating an interface that displays the one or more saved content items and the one or more keywords associated with the saved content items in a list.

10. The method of claim 1 wherein filtering the one or more displayed content items according to the selected keyword comprises displaying the one or more content items associated with the selected keyword at the top of a list comprised of the one or more displayed content items.

11. The method of claim 1 wherein filtering the one or more buddies comprises displaying one or more buddies that saved one or more content items associated with the keyword selected by the user.

12. The method of 1 wherein the one or more content items include one or more web pages, one or more digital files and one or more buddy identifiers.

13. A system for browsing a collection of content items, the system comprising:
    a processor; and
    a memory having executable instructions stored thereon that when executed by the processor cause the processor to:
        save, in a data storage device, one or more content items and one or more associated keywords, a given one of the one or more content items and one or more associated keywords specified by a user or one or more buddies associated with the user, wherein the user and the one or more buddies belong to one or more common social networks;
        generate, using a computing device, an interface that displays the one or more saved content items and the one or more associated keywords saved by the one or more buddies;
        generate an interface that displays the one or more buddies associated with the user;
        filter, using the computing device, the one or more displayed content items according to a keyword selected by the user; and
        filter the one or more displayed buddies associated with the user according to the selected keyword.

14. The system of claim 13 wherein the one or more content items include one or more instant messages.

15. The system of claim 13 wherein the one or more content items include one or more email messages.

16. The system of claim 13 wherein the one or more content items include one or more tagged documents.

17. The system of claim 16 wherein the one or more tagged documents are tagged by the user.

18. The system of claim 16 wherein the one or more tagged documents are tagged by the one or more buddies.

19. The system of claim 13 wherein filtering the one or more displayed content items according to the selected keyword comprises displaying the one or more content items associated with the selected keyword at the top of a list comprised of the one or more displayed content items.

20. Non-transitory computer readable media having stored executable instructions that when executed by a is configured to perform the steps comprising:
    saving, in a data storage device, one or more content items and one or more associated keywords, a given one of the one or more content items and one or more associated keywords specified by a user or one or more buddies associated with the user, wherein the user and the one or more buddies belong to one or more common social networks;

generating, using a computing device, an interface that displays the one or more saved content items and the one or more associated keywords saved by the one or more buddies;

generating an interface that displays the one or more buddies associated with the user;

filtering, using the computing device, the one or more displayed content items according to a keyword selected by the user; and filtering the one or more displayed buddies associated with the user according to the selected keyword.

* * * * *